United States Patent [19]
Meyers et al.

[11] 3,853,992
[45] Dec. 10, 1974

[54] ANTIBIOTIC EM-98

[75] Inventors: Edward Meyers, East Brunswick; Dorothy Smith Slusarchyk, Belle Mead; Wen-chih Liu, Princeton Junction, all of N.J.

[73] Assignee: E. R. Squibb & Sons, Inc., Princeton, N.J.

[22] Filed: July 5, 1972

[21] Appl. No.: 268,994

Related U.S. Application Data

[63] Continuation-in-part of Ser. No. 242,304, April 10, 1972, abandoned.

[52] U.S. Cl.................... 424/116, 424/118, 195/80
[51] Int. Cl............................................ A61k 21/00
[58] Field of Search ............... 424/116, 118; 195/80

[56] References Cited
OTHER PUBLICATIONS

Miller, The Pfizer Handbook of Microbiac Metabolites, McGraw-Hill Book Co., Inc., N.Y., N.Y., 1961, pages 286 and 287.

*Primary Examiner*—Jerome D. Goldberg
*Attorney, Agent, or Firm*—Lawrence S. Levinson; Merle J. Smith

[57] ABSTRACT

Antibiotic EM–98, which is active against a variety of gram positive and gram negative bacteria, is obtained by fermentation, under controlled conditions, of a strain of the microorganism *Streptomyces venezuelae*.

5 Claims, 2 Drawing Figures

FIG. 1 INFRARED SPECTRUM OF ANTIBIOTIC EM-98 HCl

INFRARED SPECTRUM OF ANTIBIOTIC EM-98

ANTIBIOTIC EM-98

This application is a continuation-in-part of application Ser. No. 242,304, filed Apr. 10, 1972, now abandoned.

SUMMARY OF THE INVENTION

This invention relates to a new antibiotic designated EM-98, to salts thereof and to a method for the production of the antibiotic. Antibiotic EM-98 is obtained by cultivating a strain of the microorganism *Streptomyces venezuelae* in an aqueous nutrient medium comprising an assimilable carbohydrate and an assimilable nitrogen source under submerged aerobic conditions until substantial antibiotic activity is imparted to the medium.

The fermentation broth is filtered. Some of the antibiotic is in the mycelial cake and this is extracted with methanol. The methanol extract is concentrated to an aqueous suspension which is then combined with the filtrate. The pooled aqueous mixture is adjusted to alkaline pH, extracted with a water immiscible alcohol like n-butanol, the alcohol extract is concentrated and the antibiotic is precipitated from the concentrate with an organic solvent like acetone. The precipitated antibiotic, EM-98, may then be separated by filtration or centrifugation. The antibiotic may be further purified by chromatographic means. The antibiotic forms salts with a variety of inorganic and organic acids. Antibiotic EM-98 and its salts, obtained in this manner, are antimicrobial agents active against bacteria as described below.

DETAILED DESCRIPTION OF THE INVENTION

The Microorganism

Figure 1:
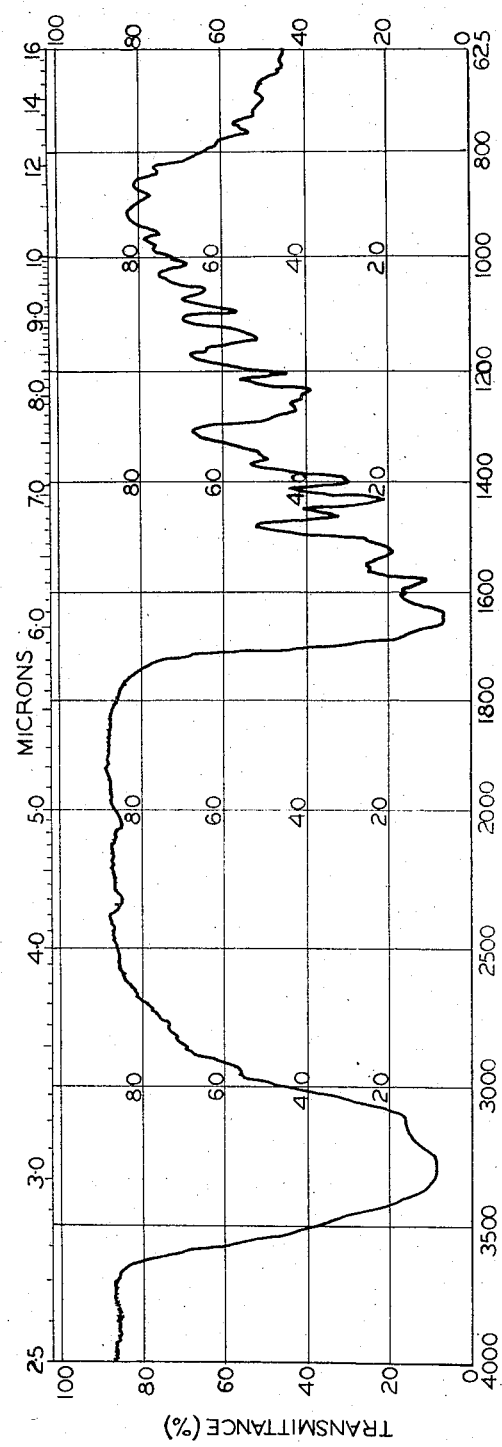
FIG. 1 shows the infrared spectrum of Antibiotic EM-98, as the hydrochloride in KBr.

The microorganism useful for the preparation of EM-98 is a strain of *Streptomyces venezuelae* isolated from a soil sample taken at Miami Beach, Fla. A culture of the living organism has been deposited in and is available from the culture collection of the American Type Culture Collection (Rockville, Md.), where it has been assigned the accession number ATCC 21782.

For isolating and characterizing the organism, a portion of the soil sample is shaken in sterile distilled water and plated on a nutrient agar medium containing:

| | Grams |
|---|---|
| Agar | 15.0 |
| Glycerol | 10.0 |
| Citric Acid | 1.2 |
| $(NH_4)_2HPO_4$ | 0.4 |
| KCl | 0.08 |
| $MgCl_2.6H_2O$ | 0.418 |
| $MnCl_2.4H_2O$ | 0.036 |
| $FeCl_3.6H_2O$ | 0.023 |
| $ZnCl_2.6H_2O$ | 0.021 |
| $CoCl_2.6H_2O$ | 0.004 |
| Distilled water to 1000 ml. | |

The medium is adjusted to pH 7.0 and sterilized in an autoclave at 121°C. for 30 minutes.

After seven to ten days incubation at 25°C., colonies of *Streptomyces venezuelae* ATCC 21782 are isolated from the plated soil. These isolated colonies are then grown in a medium containing:

| | |
|---|---|
| Beef Extract | 1.0 |
| Yeast Extract | 1.0 |
| NZ Amine A | 2.0 |
| Glucose | 10.0 |
| Agar | 15.0 |
| Distilled water to 1000 ml. | |

The medium is adjusted to pH 7.3 and autoclaved at 121°C. for 30 minutes.

The organism is a member of the red color series of Pridham [T. G. Pridham, C. W. Hesseltine and R. G. Benedict. A Guide for the Classification of Streptomyces According to Selected Groups, *Applied Microbiol.* 6:52 - 79, 1958]. The sporophores are straight and erect, morphology section Rectiflexibiles. The spores are smooth by electron microscopy. Good sporulation is obtained on Bennett's agar. The aerial mycelium is a light rose beige (ISCC-NBS-45, light grayish reddish brown). The reverse is dark brown with melanoid pigment produced on peptone containing media.

The carbohydrates, glucose, fructose, galatose and salicin are utilized for growth on the basal medium of Pridham and Gottlieb [T. J. Pridham and D. Gottlieb, The Utilization of Carbon Compounds by Some Actinomycetales as an Aid for Species Determination, *J. Bacteriology*, 56:107-114, 1948]. The EM-98 producing organism is a strain of *Streptomyces venezuelae*, and because of its inability to use xylose, arabinose and rhamnose, resembles the *Streptomyces venezuelae* strain that produces lemacidin. Morphologically, the EM-98 producing strain is indistinguishable from *Streptomyces venezuelae* ATCC 10712 (the type culture) and *Streptomyces venezuelae* ETH 9692 (lemacidin producer). They differ, however, in carbon utilization and in the antibiotics they produce. Moreover, chloramphenicol, an antibiotic also produced by a strain of *Streptomyces venezuelae*, was not produced by *Streptomyces venezuelae* ATCC 21782. Antibiotic EM-98 is distinguishable from the antibiotics netropsin, distamycin A and anthelvencins A and B by chromatography.

The Antibiotic

*Streptomyces venezuelae* ATCC 21782 produces an anti-biotic that possesses activity against various gram positive and gram negative bacteria. To form the antibiotic, according to the preferred modification, *Streptomyces venezuelae* ATCC 21782 is grown at 25°C. under submerged aerobic conditions in an aqueous nutrient medium containing an assimilable carbohydrate and nitrogen source. The fermentation is carried out for about 60 to 150 hours, preferably approximately 144 hours, at the end of which time the antibiotic has been formed.

After the fermentation is completed, filter aid is added to the broth which is then filtered. Because the antibiotic is not exclusively in the filtrate, but is also in the mycelial cake, the mycelial cake is extracted with an alcohol, like methanol. The alcohol extract is concentrated at a temperature below 45°C. until an aqueous suspension results. The aqueous suspension is combined with the filtrate, and the whole is adjusted to a pH of about 9. This aqueous pool is extracted with a water-immiscible alcohol, preferably n-butanol saturated with water. The n-butanol extract is concentrated at a temperature below 45°C. to a minimal volume. The concentrate is diluted with at least 15 volumes of an organic solvent, e.g., diethyl ether, ethyl acetate, 2- butanone or preferably acetone, resulting in a precipitate. The precipitate is collected by either filtration or centrifugation and is dried in vacuo to yield an amorphous, light tan powder.

The acetone insoluble powder may be further purified by chromatography, e.g., on a column containing diethylaminoethyl cellulose, using methanol as the developing solvent, followed by adsorption chromatography on silicic acid. Impurities are eluted first from the silicic acid column with ethyl acetate-methanol (1:1, v/v) and the active material is then eluted with methanol. Further purification is achieved by chromatography on cellulose thin layer chromatography plates with the upper layer of the solvent mixture, n-butanol-water-acetic acid (4:5:1,v/v/v), as the developing solvent. The crystalline hydrochloride salt of EM–98 is generated by treating the free base so obtained with hydrochloride acid.

Antibiotic EM–98 is a basic substance, forming salts with various organic and inorganic acids. Such salts include hydrohalides like the hydrochloride, hydrobromide, etc., other mineral acid salts like the sulfate, phosphate, nitrate, reineckate, etc. and organic acid salts like the picrate, naphthalenesulfonate, etc. The salts may be obtained from the antibiotic, produced by the procedure described above, by reacting it with the inorganic or organic acid, preferably in a solvent in which the salt is insoluble. The salt may be converted to the free antibiotic by neutralization with a base such as sodium hydroxide or barium hydroxide and then, if desired, reconverted to another salt. This provides a convenient alternate method for isolation and purification.

Figure 2:
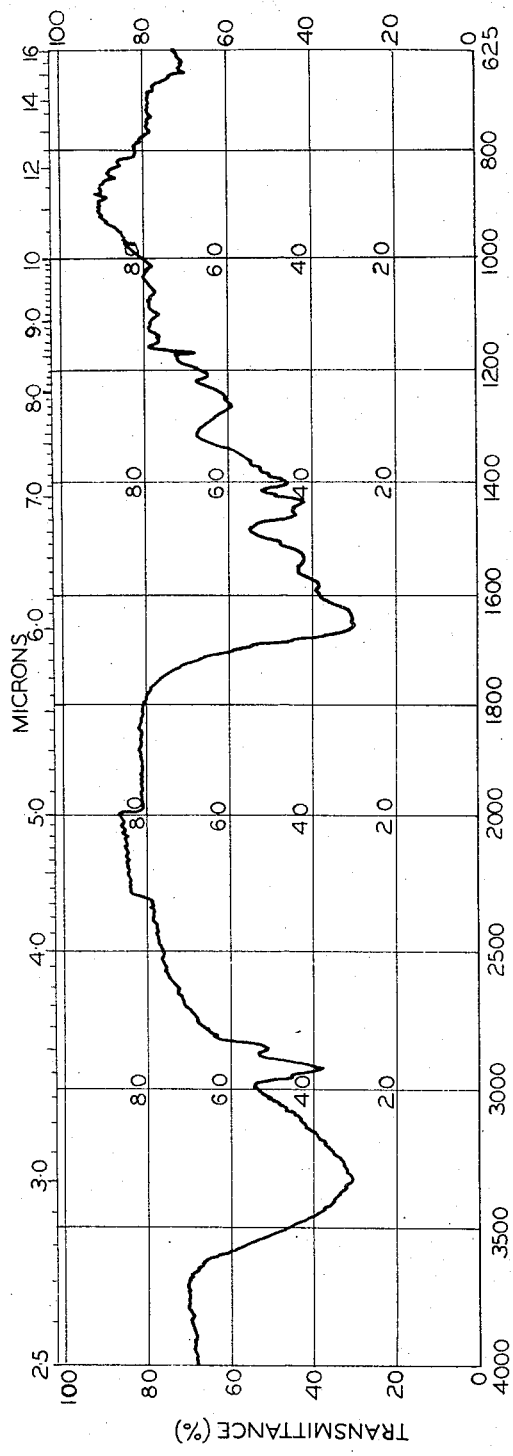
FIG. 2 shows the infrared spectrum of Antibiotic EM-98 as the free base in KBr.

The hydrochloride is a preferred salt because it is readily formed by reaction of the antibiotic with aqueous hydrochloric acid in an alcohol, like methanol. Furthermore, the hydrochloride, which is crystalline, provides a particularly convenient form in which to obtain the infrared spectrum and otherwise characterize the antibiotic. FIG. 1 shows the infrared spectrum of the antibiotic as the hydrochloride. FIG. 2 shows the infrared spectrum of the antibiotic as the free base.

The antibiotic EM–98 is active against gram-negative and gram-positive bacteria, e.g., *Staphylococcus aureus*, *Streptococcus pyogenes*, *Escherichia coli* and *Pseudomonas aeruginosa*. The antibiotic or a physiologically acceptable salt thereof may therefore be used as an antimicrobial agent either as an environmental disinfectant, e.g., in a spray or dust containing up to about 1% of the substance in a conventional carrier, or to combat infections in various animal species due to microorganisms such as those enumerated, e.g., topically in a conventional cream or ointment containing up to about 1% of the substance or in an injectable dosage form up to about 50 to 250 mg/kg/day. For example, approximately 250 mg/kg of the antibiotic, in the form of a crude acetone powder, in a single dose, is sufficient to protect mice against a lethal systemic *Escherichia coli* infection.

The invention is further illustrated by the following examples.

EXAMPLE 1

Yeast beef agar slants are seeded with *Streptomyces venezuelae* ATCC 21782. They are incubated 14 days and then used to inoculate 50 ml. of aqueous soybean medium contained in 250 ml. Erlenmeyer flasks. The composition of the germination medium is:

|  | Grams |
| --- | --- |
| Soybean meal | 15.0 |
| Dehydrated Mashed Potato | 15.0 |
| Glucose | 50.0 |
| $CoCl_2.6H_2O$ | 0.005 |
| $CaCO_3$ | 10.0 |
| Distilled Water to 1000 ml. | |

The medium is sterilized for 30 minutes at 121°C. and at 15 lbs. steam pressure.

The germination flasks are incubated at 25°C. for 96 hours on a rotary shaker, operating at 280 r.p.m. with a 2-inch throw.

Fermentation Conditions

A 5% (v/v) transfer is made from the germination flask to 500 ml. Erlenmeyer flasks containing 100 ml. of the same medium used for the germination flasks. The fermentation flasks are incubated and agitated as are the germination flasks. Samples are taken at 4 and 6 days. They are examined after centrifuging off the mycelium, adjusting the supernatant to pH 9.0 and extracting the supernatant with a half volume of n-butanol saturated with water. The centrifuged mycelium is extracted with a volume of methanol equal to that of the decanted supernatant. Both butanolic and methanolic extracts are examined by paper chromatography and by bioassay. For chromatography, suitable amounts are spotted on sheets of Whatman No. 1 paper and the chromatograms developed with a solvent system of the following composition: n-butanol, water, acetic acid, 4:5:1 (v/v/v). The upper phase of this solvent mixture is utilized as the solvent. In this system, EM–98 has an $R_f$ value of 0.3. The antibiotic is detected by bioautography against *Escherichia coli* ATCC 10536.

EXAMPLE 2

A 250 liter batch of *Streptomyces venezuelae* ATCC 21782 is fermented in a 100 gal. stainless steel vessel with the medium and operating conditions described below:

Stage 1

*Inoculum:* Culture of *Streptomyces venezuelae* ATCC 21782 is preserved by storage in liquid nitrogen and grown out on agar slants of the following composition:

|  | Grams |
| --- | --- |
| Yeast Extract | 1.0 |
| Beef Extract | 1.0 |
| NZ Amine A | 2.0 |
| Glucose | 10.0 |
| Agar | 15.0 |
| Distilled water to 1000 ml. | |

The medium is adjusted to pH 7.3 and sterilized at 121°C. and at 15 lbs. steam pressure for 30 minutes.

Surface growth from a slant is suspended in 11.0 ml. of a 0.01% sodium lauryl sulfate solution, and three ml. of this suspension is used as the source of inoculum:

Medium:

|  | Grams |
| --- | --- |
| Soybean meal | 15.0 |
| Dehydrated Mashed Potato | 15.0 |
| Glucose | 50.0 |
| $CoCl_2.6H_2O$ | 0.005 |
| $CaCO_3$ | 10.0 |
| Distilled water to 1000 ml. | |

100 ml. of this medium in a 500 ml. Erlenmeyer flask is incubated 96 hours on a rotary shaker at 25°C. The shaker operates at 280 r.p.m. with a 2-inch throw.

Stage 2

Inoculum: 100 ml. from the first stage.

Medium: Same as Stage 1. 1,000 ml. of medium and inoculum in a 4,000 ml. Erlenmeyer flask is incubated 72 hours at 25°C. on a reciprocating shaker. The shaker is operated at 120 strokes per minute with a 2-inch throw.

Stage 3

Inoculum: 1,000 ml. from Stage 2.

Medium: Same as Stage 1 with the addition of an anti-foam agent (0.05%, Ucon LB625, Union Carbide, N.Y.). 30 liters of medium and inoculum in a 38 liter fermentation vessel is incubated for 73 hours at 25°C. During incubation, the broth is agitated at 285 r.p.m. and aerated at the rate of 2.3 cubic feet per minute.

Stage 4

Inoculum: 12,500 ml. from Stage 3.

Medium: Same as Stage 3. 250 liters of medium and inoculum in a 100 gal. stainless steel fermentation vessel is incubated for 144 hours at 25°C. During incubation, the broth is agitated at 155 r.p.m. and aerated at the rate of 10.0 cubic feet per minute.

EXAMPLE 3

11.0 kg. of filter aid (Hyflo) is added to the 222 liters of fermented broth obtained as described in Example 2. The insoluble material is removed by filtration to yield 212 liters of filtrate and 43.8 kg. of filter cake.

EXAMPLE 4

The filter cake (43.8 kg.), obtained in Example 3 is extracted three times with 50 liter portions of methanol. The cake is filtered between extractions. The combined methanol extracts are concentrated in vacuo to approximately 5 liters to remove the methanol, leaving an aqueous suspension. The aqueous suspension is combined with the filtrate (212 liters) obtained in Example 3.

EXAMPLE 5

The combined aqueous pool (217 liters) obtained in Example 4 is adjusted to pH 9.1 with approximately 130 ml. of concentrated ammonium hydroxide. It is extracted three times with 66 liter portions of n-butanol saturated with water. The combined n-butanolic extracts (179 liters) are concentrated at a temperature less than 45°C. to approximately 2.5 liters. Approximately 37 liters of acetone are added to the concentrate, resulting in the appearance of an amorphous precipitate. The precipitate is collected by filtration and dried in vacuo to a constant weight (112 grams).

EXAMPLE 6

A portion, 30 g., of the acetone insoluble powder is dissolved in methanol, 20 ml., and the solution placed on top of a diethylaminoethyl cellulose column, 6 cm × 50 cm, containing approximately 100 grams of the diethylaminoethyl cellulose (Cellex-D, Bio-Rad Laboratories, Richmond, Calif.) packed in methanol. The column is developed with methanol, and 20 ml. fractions are collected. The bioactive fractions, as determined by paper disc-agar diffusion assay against *Escherichia coli* ATCC 10536, are combined and concentrated to dryness, yielding 5 g. of residue.

EXAMPLE 7

5 grams of the residue obtained in Example 6 are dissolved in 10 ml. of ethyl acetate-methanol 1:1 (v/v) and the solution placed on top of a silicic acid column, 3.5 cm × 45 cm, containing approximately 120 grams of the silicic acid packed in ethyl acetate-methanol 1:1 (v/v). The column is developed with this same solvent. After the elution of inactive, pigmented materials, the eluate becomes pale yellow. At this point, the developing solvent is changed to methanol and the elution continued. The bioactive fractions, as determined by paper disc-agar diffusion assay against *Escherichia coli* ATCC 10536, are combined and concentrated to dryness, yielding approximately 0.7 g. of solid residue.

EXAMPLE 8

0.7 grams of the residue obtained in Example 7, dissolved in 1 ml. of methanol are streaked 2 cm. from the bottom of 20 cm × 20 cm 1,000 $\mu$ layer cellulose plates (Analtech, Inc., Wilmington, Del.). The plates are developed with the upper layer of the solvent system: n-butanol-water-acetic acid, 4:5:1 (v/v/v). EM-98, appearing as a blue fluorescent band when viewed under ultraviolet light (360 nm) ($R_f = 0.3$), is scraped off the plate and eluted from the cellulose with methanol. The methanol eluate is concentrated to dryness to yield EM-98 as the free base (0.1 g.).

EXAMPLE 9

The hydrochloride salt of EM-98 is prepared by dissolving 0.1 g. of the free base, obtained in Example 8, in 1 ml. of methanol. 6N HCl is added to the solution to make the pH approximately 1. The solution is then evaporated to dryness. The residue is then crystallized from an acetone-methanol mixture, yielding approximately 0.1 g.

EXAMPLE 10

100 mg. of EM-98 hydrochloride, obtained in Example 9, are dissolved in 5 ml. of water and the pH adjusted to approximately 5 with dilute sodium hydroxide. A saturated solution of picric acid is added dropwise to the antibiotic solution resulting in a precipitate. The addition of the picric acid solution is continued until no more precipitate is formed. The precipitate is collected by filtration and is then crystallized from 80% aqueous acetone. After recrystallization, 80 mg. of yellow, needle-like crystals are obtained.

The following are physical and chemical properties of antibiotic EM-98, the hydrochloride and the picrate:

EM-98 (free base): Anal. Calc. for $C_{18}H_{30}N_9O_5$ — C, 47.77%; H, 6.68%; N, 27.86%.

Found: C, 46.84%; H, 6.52%; N, 28.49%.

EM–98 hydrochloride: Calc. for $C_{18}H_{30}N_9O_5 \cdot 2HCl$ — C, 41.03%; H, 6.11%; N, 24.05%; Cl, 13.36%; O, 15.20%.

Found: C, 40.23%; H, 5.97%; N, 24.59%, Cl, 13.40%; O (by difference), 15.81%.

EM–98 picrate: Calc. for $C_{18}H_{30}N_9O_5 \cdot 2C_6H_3N_3O_7$ — C, 39.56%; H, 3.96%; N, 23.07%; O, 33.40%.

Found: C, 39.49%; H, 3.78%, N, 24.20%; O (by difference), 32.54%.

UV (hydrochloride):

$\lambda$ max in methanol 240 nm, $E_{1\ cm}^{1\%} = 375$; 300 nm, $E_{1\ cm}^{1\%} = 390$;

UV (picrate):

$\lambda$ max in methanol 240 nm, $E_{1\ cm}^{1\%} = 667$; 305 nm, $E_{1\ cm}^{1\%} = 460$; 353 nm, $E_{1\ cm}^{1\%} = 345$.

$R_f$ (free base) [Whatman No. 1 filter paper, n-butanol, water, acetic acid (4:5:1, v/v/v)]: 0.3 I.R.: The infrared spectrum of EM–98 hydrochloride, in KBr, is shown in FIG. 1.

I.R.: The infrared spectrum of EM–98 as the free base, in KBr, is shown in FIG. 2.

Melting point of the hydrochloride: 189°–191°C.

Melting point of the picrate: 209°–210°C.

Solubility: EM–98 hydrochloride is soluble in water and methanol. It is insoluble in acetone, ethyl acetate and chloroform.

Color tests (of both free base and hydrochloride): EM–98 reacts negatively in the following color reactions: ninhydrin, anthrone, Sakaguchi and $FeCl_3$.

Neutral equivalent of picrate 449

Molecular weight of picrate 910 (calc.)

Molecular weight of free base 452 (calc.)

Empirical formula of free base $C_{18}H_{30}N_9O_5$.

EXAMPLE 11

Two fold broth dilution assays done with several microorganisms give the results shown in the following table. The antibiotic used in this study is the free base obtained in Example 8.

| Organism | MIC ($\mu$/ml) |
| --- | --- |
| Staphylococcus aureus FDA 209P | 75 |
| Streptococcus pyogenes C203 | 50 |
| Escherichia coli ATCC 10536 | 100 |
| Escherichia coli SC8294* | 100 |
| Pseudomonas aeruginosa SC 8329* | 100 |
| Candida albicans CBS 35H | >100 |

(*) Squibb culture

EXAMPLE 12

Mice are injected intraperitoneally with 500 $LD_{50}$ doses of *Escherichia coli* SC 8294 suspended in 5% hog gastric mucin and 1 hour post-infection are given Antibiotic EM–98 subcutaneously. The antibiotic used in this study is equivalent in purity to the acetone insoluble powder obtained in Example 5. Approximately 250 mg/kg of the antibiotic preparation is sufficient to protect 100% of the mice against death. None of the mice survives when the antibiotic is not administered.

Mice are injected intraperitoneally with 100 $LD_{50}$ doses of *Streptococcus pyogenes* C203, and 1 hour and 5 hours postinfection are given Antibiotic EM–98 subcutaneously. The antibiotic used in this study is equivalent in purity to the acetone insoluble powder obtained in Example 5. Approximately 250 mg/kg of the antibiotic preparation is sufficient to protect 20% of the mice against death. No mice survive in the control group not receiving the antibiotic.

What is claimed is:

1. A process for producing Antibiotic EM–98 which comprises cultivating Streptomyces venezuelae ATCC 21782 in an aqueous nutrient medium comprising an assimilable carbohydrate and an assimilable nitrogen source under submerged aerobic conditions until substantial antibiotic activity is imparted to the medium.

2. A process as in claim 1 wherein the microorganism is cultivated at about 25°C.

3. A process as in claim 2 wherein the fermentation is continued for about 60 to 150 hours.

4. An antibiotic selected from the group consisting of Antibiotic EM–98 and acid salts thereof, said antibiotic having the infrared absorption spectrum in FIG. 2, the approximate elemental analysis C, 46.84; H, 6.52; N, 28.49 and whose hydrochloride has the infrared absorption spectrum in FIG. 1, a melting point about 189°–191°C., and is soluble in water and methanol but insoluble in acetone, ethyl acetate and chloroform.

5. The hydrochloride of Antibiotic EM–98, said hydrochloride having the infrared absorption spectrum in FIG. 1, the approximate elemental analysis C, 40.23%; H, 5.97%; N, 24.59%; Cl, 13.40%; O, 15.81%, a melting point about 189°–191°C and is soluble in water and methanol but insoluble in acetone, ethyl acetate and chloroform.

* * * * *